(12) United States Patent
Yui et al.

(10) Patent No.: US 12,059,852 B2
(45) Date of Patent: Aug. 13, 2024

(54) COMPOSITE MATERIAL MOLDING METHOD AND COMPOSITE MATERIAL MOLDING DEVICE

(71) Applicant: MITSUBISHI HEAVY INDUSTRIES, LTD., Tokyo (JP)

(72) Inventors: Yuichi Yui, Tokyo (JP); Akihisa Okuda, Tokyo (JP); Masahiko Shimizu, Tokyo (JP); Yuki Kani, Tokyo (JP); Akihiro Terasaka, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 403 days.

(21) Appl. No.: 17/598,559

(22) PCT Filed: Jun. 6, 2019

(86) PCT No.: PCT/JP2019/022589
§ 371 (c)(1),
(2) Date: Sep. 27, 2021

(87) PCT Pub. No.: WO2020/245990
PCT Pub. Date: Dec. 10, 2020

(65) Prior Publication Data
US 2022/0143935 A1 May 12, 2022

(51) Int. Cl.
*B29C 70/44* (2006.01)
*B29C 70/54* (2006.01)

(52) U.S. Cl.
CPC .......... *B29C 70/44* (2013.01); *B29C 70/544* (2021.05)

(58) Field of Classification Search
CPC .............................. B29C 70/44; B29C 70/544
See application file for complete search history.

(56) References Cited

U.S. PATENT DOCUMENTS 6,506,325 B1 *   1/2003   Cartwright ............ B29C 70/443
                                                    264/516
2002/0022422 A1 * 2/2002 Waldrop, III ...... B29D 99/0014
                                                    264/510
(Continued)

FOREIGN PATENT DOCUMENTS

FR      3100736 A1 *   3/2021   ......... B29C 43/3642
GB      2534171 A  *   7/2016   ......... B29C 43/3642
(Continued)

OTHER PUBLICATIONS

PCT/ISA/210, "International Search Report for PCT International Application No. PCT/JP/2019/022589," Aug. 27, 2019.
(Continued)

*Primary Examiner* — Robert B Davis
(74) *Attorney, Agent, or Firm* — HAUPTMAN HAM, LLP (57) ABSTRACT

A composite material molding method includes a first disposition step for disposing a prepreg on a jig molding surface of a molding jig; a first sealing step for airtightly sealing the prepreg by covering the prepreg with a first resin bag; a second disposition step for disposing a breather so as to cover the first resin bag; a second sealing step for airtightly sealing the breather so as to cover the breather with a second resin bag; a first depressurization step for depressurizing a first space sealed by the first resin bag; a second depressurization step for depressurizing a second space sealed by the second resin bag; and a heat-curing step for heat-curing the prepreg by supplying the internal space of a pressure vessel with a steam with a predetermined temperature and a predetermined pressure.

6 Claims, 8 Drawing Sheets

(56) References Cited

U.S. PATENT DOCUMENTS

| | | |
|---|---|---|
| 2007/0113953 A1 | 5/2007 | Haywood |
| 2010/0314807 A1 | 12/2010 | Lengsfeld et al. |
| 2012/0133067 A1 | 5/2012 | Ashida |
| 2014/0353916 A1 | 12/2014 | Dull |
| 2016/0263784 A1 | 9/2016 | Itou et al. |
| 2017/0066202 A1* | 3/2017 | McBrayer ............... B29C 70/44 |
| 2018/0099462 A1 | 4/2018 | Cuenca et al. |

FOREIGN PATENT DOCUMENTS

| | | |
|---|---|---|
| JP | 2008-501555 A | 1/2008 |
| JP | 2011-507738 A | 3/2011 |
| JP | 2012-153133 A | 8/2012 |
| JP | 2016-144867 A | 8/2016 |
| JP | 2016-168684 A | 9/2016 |

OTHER PUBLICATIONS

PCT/ISA/237, "Written Opinion for PCT International Application No. PCT/JP/2019/022589," Aug. 27, 2019.

* cited by examiner

COMPOSITE MATERIAL MOLDING METHOD AND COMPOSITE MATERIAL MOLDING DEVICE

RELATED APPLICATIONS

The present application is National Phase of International Application No. PCT/JP2019/022589 filed Jun. 6, 2019, the disclosure of which is hereby incorporated by reference herein in its entirety.

TECHNICAL FIELD

The present invention relates to a composite material molding method and a composite material molding device.

BACKGROUND ART

In the related art, a molding method for a composite material, in which an autoclave is used, is widely used as a method of molding a composite material obtained by laminating fiber preforms. In the molding method of the related art, a prepreg containing an uncured matrix resin is covered with a bag film, the inside of the bag film is depressurized, and the prepreg is brought into a pressurized state due to a pressure difference with an outside gas. In addition, the prepreg is brought into a heated state by filling a space outside the bag film with heated air.

In addition, in recent years, a technique of using steam having a larger heat capacity than air as a heating source has been proposed (for example, refer to PTL 1). PTL 1 discloses that a prepreg bending molding is performed by covering a prepreg with a silicone rubber bag and heating the prepreg with steam while depressurizing a space where the prepreg is disposed.

CITATION LIST

Patent Literature

[PTL 1] Japanese Unexamined Patent Application Publication No. 2016-168684

SUMMARY OF INVENTION

Technical Problem

However, in PTL 1, the prepreg is enclosed by placing an outer frame and clamping with a vice such that a gap is not generated between the silicone rubber bag and a box-type jig, after the silicone rubber bag is laid on the prepreg. For this reason, special jigs such as the box-type jig and the outer frame are required, and complicated work of clamping with the vice is required.

Thus, making special jigs and complicated work unnecessary, for example, by adhering a bag to a jig molding surface on which the prepreg is placed with a sealant is considered. However, in a case where a resin film having high adhering strength to the sealant is used, there is a possibility that the resin film breaks due to hydrolysis (chemical destruction) caused by steam.

In addition, there is a possibility that steam absorbed by the resin film under a high pressure environment expands under a low pressure environment, and breakage (mechanical destruction) occurs from the inside of the resin film. In this case, there is a possibility that the prepreg cannot be appropriately pressurized as a pressure difference between the inside and outside of the resin film disappears due to the breakage of the resin film. In addition, since steam is used as a heating source, there is a possibility that the steam flowed in from the broken resin film reaches the prepreg and is absorbed by the prepreg, and a composite material having a desired performance cannot be molded.

The present invention is devised in view of such circumstances, and an object thereof is to provide a composite material molding method and a composite material molding device that can efficiently heat a composite material using steam and prevent the steam from reaching the composite material.

Solution to Problem

In order to solve the problem, the composite material molding method and the composite material molding device of the present invention adopt the following means.

According to one aspect of the present invention, there is provided a composite material molding method of molding a composite material. The method includes a first disposing step of disposing the composite material on a jig molding surface of a molding jig provided in an internal space of an enclosable pressure vessel, a first sealing step of airtightly sealing the composite material by covering the composite material with a first resin bag and adhering the first resin bag and the jig molding surface to each other with a sealant, a second disposing step of disposing a ventilation member for securing a ventilation space such that the first resin bag is covered, a second sealing step of airtightly sealing the ventilation member by covering the ventilation member with a second resin bag and adhering the second resin bag and the jig molding surface to each other with the sealant, a first depressurizing step of depressurizing a first space sealed with the first resin bag, a second depressurizing step of depressurizing a second space sealed with the second resin bag, and a heat-curing step of heat-curing the composite material by supplying steam with a predetermined temperature and a predetermined pressure to the internal space of the pressure vessel in a state where the pressure vessel is enclosed.

Since the composite material is heat-cured in the composite material molding method according to the one aspect of the present invention, steam with a predetermined temperature and a predetermined pressure is supplied to the internal space of the pressure vessel in the heat-curing step. For this reason, the composite material can be efficiently and quickly heated with steam having a larger heat capacity than air compared to a case where air is used as a heating source.

In addition, the composite material is airtightly sealed by adhering the first resin bag and the jig molding surface to each other with the sealant, the ventilation member is airtightly sealed by further adhering the second resin bag and the jig molding surface to each other with the sealant, and the space sealed with the second resin bag is depressurized in the second depressurizing step. For this reason, even when steam has infiltrated into the space where the ventilation member is disposed, the infiltrated steam is dispersed in the depressurized space, and is discharged to the outside of the space in the end. Since the composite material is airtightly sealed with the first resin bag, the steam is prevented from reaching the composite material. Further, since the steam is discharged to the outside without reaching the first resin bag, it is prevented that the first resin bag is damaged by hydrolysis with steam and the steam reaches the composite material.

In the composite material molding method according to the one aspect of the present invention, a configuration where the second resin bag is a bag of which a main component is a fluororesin material and the first resin bag is a bag of which a main component is a resin material having higher adhering strength to the sealant than the fluororesin material may be adopted.

In the composite material molding method having the present configuration, the second resin bag is a bag of which a main component is a fluororesin material. Since the resistance of the bag, of which a main component is a fluororesin material, to steam is sufficiently higher than a resin film of which a main component is nylon, the steam can be more reliably prevented from reaching a laminate. In addition, since the first resin bag is a resin film of which a main component is a resin material having higher adhering strength to the sealant than the fluororesin material, the steam can be more reliably prevented from infiltrating from an adhering portion between the jig molding surface and the resin film. Herein, the first resin bag can be, for example, a resin film of which a main component is nylon or polyurethane.

The composite material molding method having the configuration may further include a third disposing step of disposing the ventilation member such that the second resin bag is covered, a third sealing step of airtightly sealing the ventilation member by covering the ventilation member, which covers the second resin bag, with a third resin bag and adhering the third resin bag and the jig molding surface to each other with the sealant, and a third depressurizing step of depressurizing a third space sealed with the third resin bag. The third resin bag may be formed of a material of which a main component is fluororubber or silicone rubber.

In the composite material molding method, the ventilation member is airtightly sealed by adhering the third resin bag and the jig molding surface to each other with the sealant, and the space sealed with the third resin bag is depressurized in the third depressurizing step. For this reason, even when steam has infiltrated into the space where the ventilation member is disposed, the infiltrated steam is dispersed in the depressurized space, and is discharged to the outside of the space in the end. Since the composite material is airtightly sealed with the first resin bag and the second resin bag, the steam is prevented from reaching the composite material.

Further, since steam is discharged to the outside without reaching the second resin bag, it is prevented that the second resin bag is damaged by hydrolysis with the steam and the steam reaches the composite material. In addition, since the third resin bag is formed of a material of which a main component is fluororubber or silicone rubber with high resistance to steam, the third resin bag can be reused for molding a composite material a plurality of times.

The composite material molding method having the configuration may further include an enclosing step of forming an enclosed space by covering the second resin bag with a third resin bag and adhering the third resin bag and the jig molding surface to each other with the sealant and a filling step of filling the enclosed space with a liquid for preventing the steam from coming into contact with the second resin bag. The third resin bag may be formed of a material of which a main component is fluororubber or silicone rubber.

In the composite material molding method, the third resin bag and the jig molding surface are adhered to each other with the sealant to form an enclosed space with the second resin bag, and the enclosed space is filled with the liquid for preventing steam from coming into contact with the second resin bag. For this reason, even when the third resin bag is damaged due to hydrolysis caused by the steam, the steam infiltrated into the enclosed space can be prevented from reaching the second resin bag.

In the composite material molding method having the configuration, the composite material may be a laminate in which a fiber preform is laminated together with a resin material.

Since the composite material is the laminate in which the fiber preform is laminated together with the resin material, a composite material having sufficient hardness can be molded.

According to another aspect of the present invention, there is provided a composite material molding device that molds a composite material. The device includes an enclosable pressure vessel, a molding jig that is provided in an internal space of the pressure vessel and has a jig molding surface for disposing the composite material containing a resin material, a first resin bag that airtightly seals the composite material by covering the composite material and being adhered to the jig molding surface with a sealant, a ventilation member that is disposed to cover the first resin bag and is used for securing a ventilation space, a second resin bag that airtightly seals the ventilation member by covering the ventilation member and being adhered to the jig molding surface with the sealant, a depressurizing unit that depressurizes a first space sealed with the first resin bag and a second space sealed with the second resin bag; and a steam supply unit that supplies steam with a predetermined temperature and a predetermined pressure to the internal space of the pressure vessel in a state where the pressure vessel is enclosed and heat-cures the composite material.

Since the composite material is heat-cured in the composite material molding device according to the aspect of the present invention, the steam supply unit supplies steam with a predetermined temperature and a predetermined pressure to the internal space of the pressure vessel. For this reason, the composite material can be efficiently and quickly heated with steam having a larger heat capacity than air compared to a case where air is used as a heating source.

In addition, the composite material is airtightly sealed by adhering the first resin bag and the jig molding surface to each other with the sealant, the ventilation member is airtightly sealed by further adhering the second resin bag and the jig molding surface to each other with the sealant, and the space sealed with the second resin bag is depressurized in the second depressurizing step. For this reason, even when steam has infiltrated into the space where the ventilation member is disposed, the infiltrated steam is dispersed in the depressurized space, and is discharged to the outside of the space in the end. Since the composite material is airtightly sealed with the first resin bag, the steam is prevented from reaching the composite material. Further, since the steam is discharged to the outside without reaching the first resin bag, it is prevented that the first resin bag is damaged by hydrolysis with steam and the steam reaches the composite material.

Advantageous Effects of Invention

With the present invention, it is possible to provide a composite material molding method and a composite material molding device that can efficiently heat a composite material using steam and prevent the steam from reaching the composite material.

DESCRIPTION OF EMBODIMENTS

First Embodiment

Figure 1:
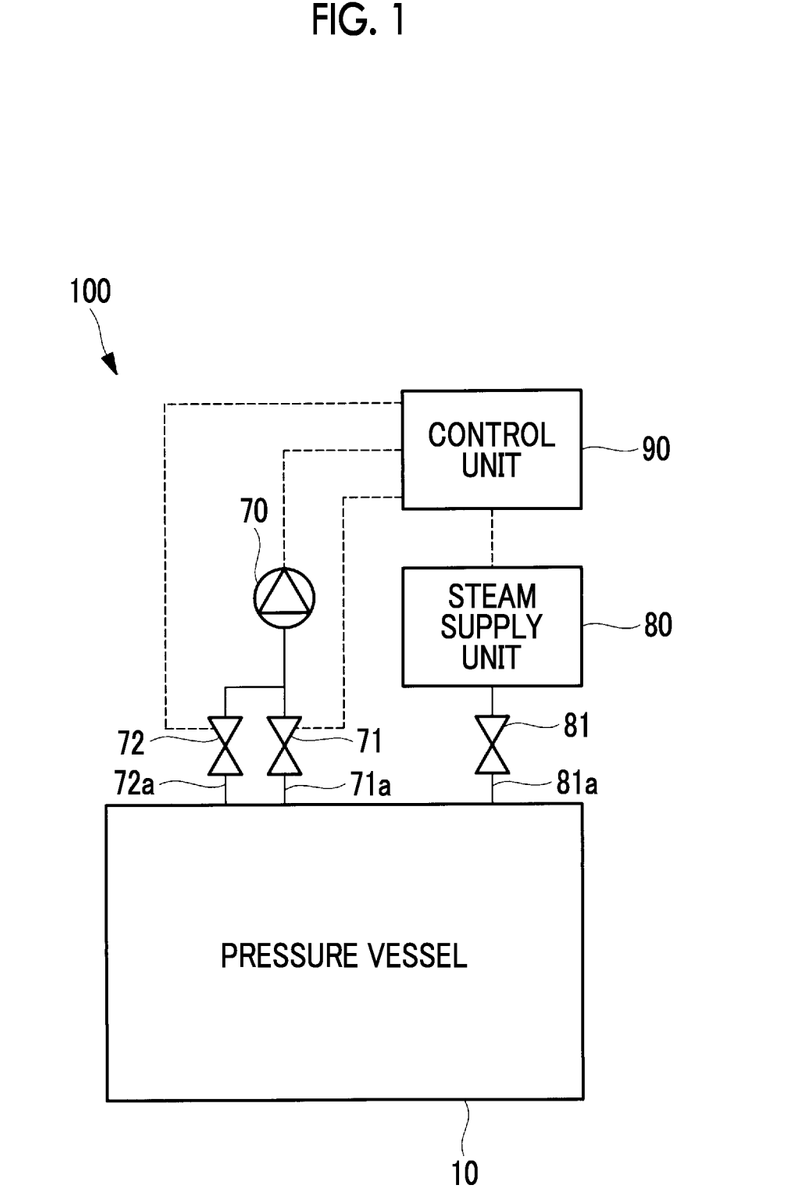
FIG. 1 is a schematic configuration diagram showing a composite material molding device according to a first embodiment of the present invention.
Figure 2:
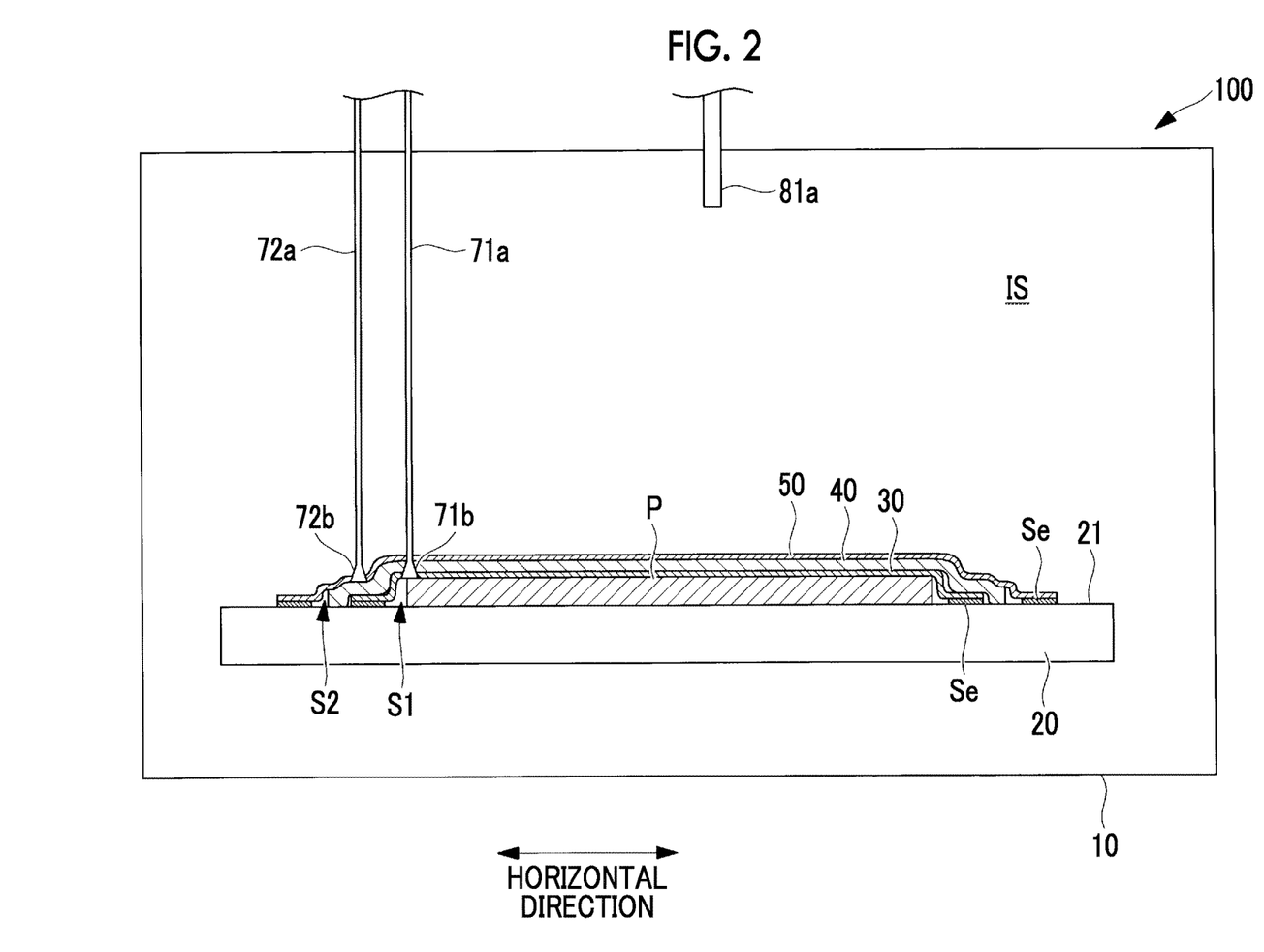
FIG. 2 is a vertical sectional view of the composite material molding device shown in FIG. 1.
Figure 3:
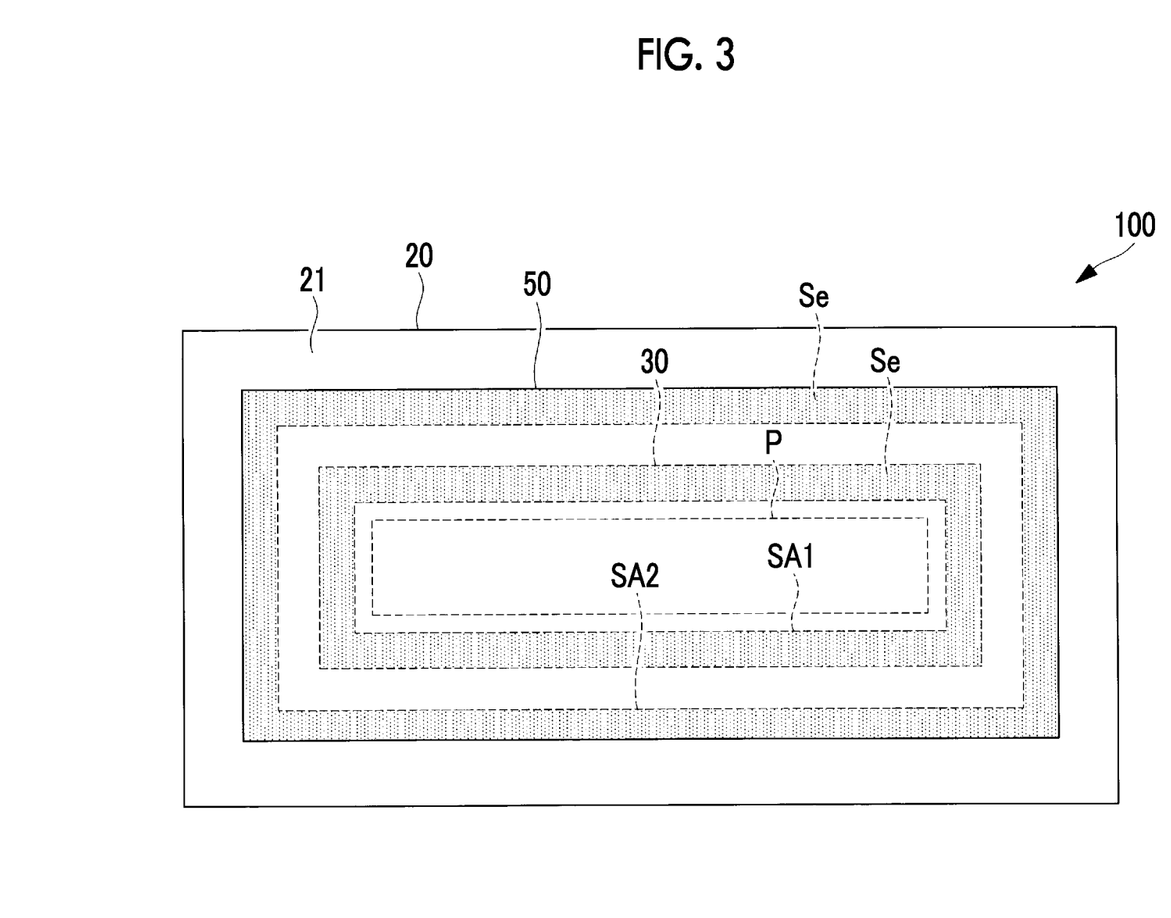
FIG. 3 is a plan view of an internal space of a pressure vessel shown in FIG. 2, which is viewed from above.

Hereinafter, a composite material molding device 100 and a composite material molding method using the composite material molding device according to a first embodiment of the present invention will be described with reference to the drawings. FIG. 1 is a schematic configuration diagram showing the composite material molding device 100 according to the first embodiment of the present invention. FIG. 2 is a vertical sectional view of the composite material molding device 100 shown in FIG. 1. FIG. 3 is a plan view of an internal space shown in FIG. 2, which is viewed from above. FIG. 3 is a plan view of an internal space of a pressure vessel 10 shown in FIG. 2, which is viewed from above.

The composite material molding device 100 of the present embodiment is a device that molds a fiber-reinforced composite material having a desired shape by heat-curing a prepreg (composite material) P obtained by laminating a fiber preform together with a resin material. Herein, the prepreg means a material that contains a fiber preform and an uncured matrix resin and becomes a fiber-reinforced composite material as the fiber preform and the uncured matrix resin are heat-cured. In addition, the fiber preform is, for example, carbon fiber, glass fiber, and aramid fiber. In addition, the matrix resin is a heat-curing resin, such as epoxy, unsaturated polyester, vinyl ester, bismaleimide, phenol, cyanate, and polyimide. By heat-curing one or a plurality of sheets of prepregs, a fiber-reinforced composite material is molded.

As shown in FIGS. 1 and 2, the composite material molding device 100 of the present embodiment includes an enclosable pressure vessel 10, a molding jig 20, a first resin bag 30, a breather (ventilation member) 40, a second resin bag 50, a vacuum pump (depressurizing unit) 70, a steam supply unit 80, and a control unit 90.

The pressure vessel 10 is an enclosable vessel, to which an openable and closable door (not shown) is attached and which forms an internal space IS enclosed by bringing the door into a closed state. The internal space IS of the pressure vessel 10 accommodates the molding jig 20 and the prepreg P disposed on the molding jig 20.

The molding jig 20 is a member that is provided in the internal space IS of the pressure vessel 10, has a jig molding surface 21 for disposing the prepreg P, and is formed in a plate shape. The molding jig 20 is disposed on a provision table (not shown) provided in the internal space IS of the pressure vessel 10. The jig molding surface 21 of the molding jig 20 is a surface extending in a horizontal direction shown in FIG. 2, and the prepreg P is disposed on the jig molding surface 21. The molding jig 20 is formed of, for example, a heat-resistant metallic material such as an aluminum alloy and iron.

The first resin bag 30 is a sheet-shaped member that covers the entire surface of the prepreg P and airtightly seals the prepreg P by being adhered to the jig molding surface 21 of the molding jig 20 with a sealant Se. The first resin bag 30 is formed of a resin film of which a main component is nylon or polyurethane. It is desirable that the first resin bag 30 has a thickness of, for example, 25 μm or more and 75 μm or less.

As shown in FIG. 2, the breather 40 is a member that is disposed to cover the entire surface of the first resin bag 30 and is used for securing a ventilation space allowing a gas to pass between the first resin bag 30 and the second resin bag 50. The breather 40 is, for example, a polyester mat formed of a fibrous polyester. The breather 40 has a thickness of, for example, 0.2 mm or more and 5 mm or less.

As shown in FIG. 2, the second resin bag 50 is a sheet-shaped member that covers the entire surface of the breather 40 and seals the breather 40 by being adhered to the jig molding surface 21 with the sealant Se. The second resin bag 50 is formed of a resin film of which a main component is a fluororesin material. The fluororesin material is, for example, a copolymer of tetrafluoroethylene and hexafluoropropylene (FEP). It is desirable that the second resin bag 50 has a thickness of, for example, 25 μm or more and 75 μm or less.

As described above, the first resin bag 30 is formed of a resin film of which a main component is nylon or polyurethane. The resin film of which a main component is nylon or polyurethane has higher adhering strength to the sealant Se than the resin film of which a main component is a fluororesin material. For this reason, adhering strength between the first resin bag 30 and the sealant Se is higher than adhering strength between the second resin bag 50 and the sealant Se. Accordingly, the first resin bag 30 is more advantageous than the second resin bag 50 in terms of adhesion to the jig molding surface 21.

As shown in FIG. 3, the sealant Se forms a first sealing region SA1 that surrounds the entire periphery of the prepreg P by adhering the first resin bag 30 and the jig molding surface 21 to each other. In addition, the sealant Se forms a second sealing region SA2 that surrounds the entire periphery of the prepreg P by adhering the second resin bag 50 and the jig molding surface 21 to each other. The second sealing region SA2 is formed to surround the outer side of the first sealing region SA1. In this manner, the sealant Se separates a first space S1 where the prepreg P is disposed from the internal space IS of the pressure vessel 10 with a double sealing region including the first sealing region SA1 and the second sealing region SA2. The sealant Se is formed of, for example, a material of which a main component is butyl rubber.

The vacuum pump 70 is a device that depressurizes the first space S1 sealed with the first resin bag 30 and a second space S2 sealed with the second resin bag 50. As shown in FIG. 1, the vacuum pump 70 is connected to a pipe 71a via an opening-closing valve 71, and is connected to the pipe 72a via an opening-closing valve 72. As shown in FIG. 3, the pipe 71a is connected to a vacuum port 71b attached to the first resin bag 30, and the pipe 72*a* is connected to a vacuum port 72*b* attached to the second resin bag 50.

The vacuum pump 70, the opening-closing valve 71, and the opening-closing valve 72 are respectively controlled by control signals transmitted from the control unit 90 via control signal lines (broken lines in FIG. 1). As the control unit 90 brings the vacuum pump 70 into an operating state and brings the opening-closing valve 71 into an open state, air in the first space S1 is sucked via the vacuum port 71*b* and the first space S1 is depressurized to a vacuum state. In addition, as the control unit 90 brings the vacuum pump 70 into the operating state and brings the opening-closing valve 72 into an open state, air in the second space S2 is sucked via the vacuum port 72*b* and the second space S2 is depressurized to a vacuum state.

The steam supply unit 80 is a device that supplies steam with a predetermined temperature and a predetermined pressure to the internal space IS of the pressure vessel 10 in a state where the pressure vessel 10 is enclosed and heat-cures the prepreg P. As shown in FIG. 1, the steam supply unit 80 is connected to a pipe 81*a* via an opening-closing valve 81. As shown in FIG. 3, the pipe 81*a* communicates with the internal space IS of the pressure vessel 10.

The steam supply unit 80 and the opening-closing valve 81 are controlled by a control signal transmitted from the control unit 90 via a control signal line. As the control unit 90 brings the steam supply unit 80 into an operating state and brings the opening-closing valve 81 into an open state, steam is supplied to the internal space IS via the pipe 81*a*. The steam supply unit 80 generates, for example, saturated steam as steam to be supplied to the internal space IS of the pressure vessel 10. The control unit 90 controls the steam supply unit 80 such that the temperature of the saturated steam is, for example, within a range of 160° C. or higher and 190° C. or lower. The saturated steam pressure is uniquely determined with respect to the temperature. For this reason, the saturated steam pressure is within a range of approximately 6 atm (absolute pressure) to approximately 13 atm (absolute pressure).

The control unit 90 is a device that controls the composite material molding device 100. The control unit 90 controls the vacuum pump 70, the opening-closing valve 71, the opening-closing valve 72, the steam supply unit 80, and the opening-closing valve 81 via the control signal lines shown by the broken lines in FIG. 1.

Figure 4:
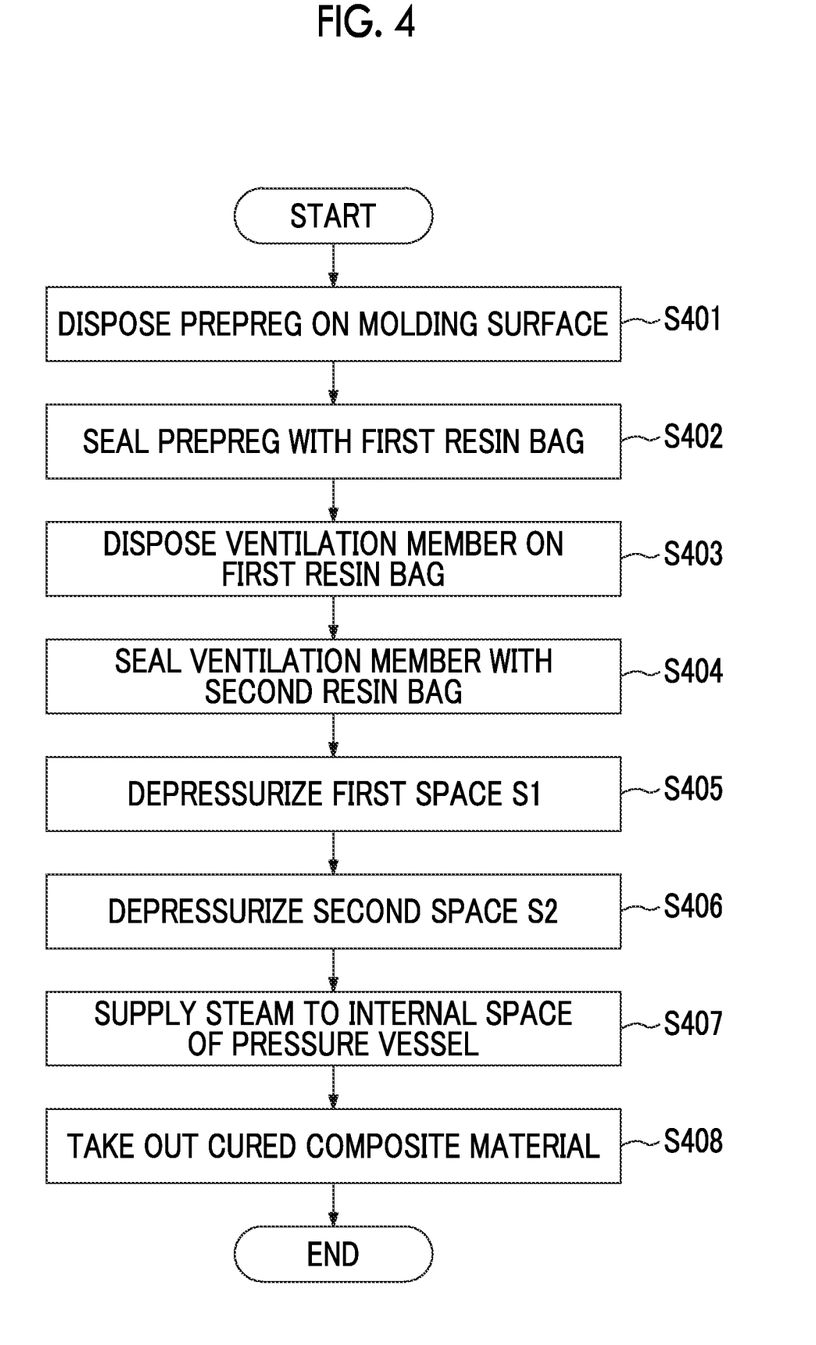
FIG. 4 is a flowchart showing a composite material molding method according to the first embodiment.

Next, the composite material molding method performed by the composite material molding device 100 of the present embodiment will be described with reference to FIG. 4. FIG. 4 is a flowchart showing the composite material molding method according to the present embodiment.

In Step S401 (first disposing step), the prepreg P is disposed on the jig molding surface 21 of the molding jig 20. For example, an operator operates a transport device (not shown) and disposes the prepreg P on the jig molding surface 21.

In Step S402 (first sealing step), the prepreg P is airtightly sealed by covering the entire surface of the prepreg P with the first resin bag 30 and adhering the first resin bag 30 and the jig molding surface 21 to each other with the sealant Se. The operator of the composite material molding device 100 disposes the sealant Se on the jig molding surface 21 or an edge portion of the first resin bag 30, and bonds the first resin bag 30 to the jig molding surface 21 such that the prepreg P is covered with the first resin bag 30.

In Step S403 (second disposing step), the breather 40 is disposed on the first resin bag 30 such that the first resin bag 30 is covered.

In Step S404 (second sealing step), the breather 40 is airtightly sealed by covering the breather 40 with the second resin bag 50 and adhering the second resin bag 50 and the jig molding surface 21 to each other with the sealant Se. The operator of the composite material molding device 100 disposes the sealant Se on the jig molding surface 21 or an edge portion of the second resin bag 50, and bonds the second resin bag 50 to the jig molding surface 21 such that the breather 40 is covered with the second resin bag 50.

In Steps S401 to S404 described above, the door is in an open state without enclosing the pressure vessel 10. When Step S404 ends, the operator of the composite material molding device 100 brings the door into a closed state, and encloses the pressure vessel 10.

In Step S405 (first depressurizing step), the vacuum pump 70 is brought into an operating state, the opening-closing valve 71 is brought into an open state, and the first space S1 sealed with the first resin bag 30 is depressurized. The control unit 90 continues processing of depressurizing the first space S1 to maintain a vacuum state until Step S407, which is to be described later, ends.

In Step S406 (second depressurizing step), the vacuum pump 70 is brought into an operating state, the opening-closing valve 72 is brought into an open state, and the second space S2 sealed with the second resin bag 50 is depressurized. The control unit 90 continues processing of depressurizing the second space S2 to maintain a vacuum state until Step S407, which is to be described later, ends.

In Step S407 (heat-curing step), depending on the fact that the first space S1 and the second space S2 are in a vacuum state, the steam supply unit 80 and the opening-closing valve 81 are controlled in a state where the pressure vessel 10 is enclosed such that steam with a predetermined temperature and a predetermined pressure is supplied to the internal space IS of the pressure vessel 10.

The prepreg P disposed in the internal space IS of the pressure vessel 10 is brought into a pressurized state due to a differential pressure between the pressure of the first space S1 depressurized in a vacuum state and the internal space IS pressurized by steam. In addition, the prepreg P is brought into a heated state due to heat transferred from the steam. As the pressurized state and the heated state are continued for predetermined time, a heat-curing resin, which is a matrix resin, is cured and the prepreg P is cured in a state of maintaining a desired shape. Accordingly, a composite material obtained by curing a matrix resin is molded from the prepreg P.

In Step S408, operations of the vacuum pump 70 and the steam supply unit 80 are stopped. The operator of the composite material molding device 100 confirms that the internal space IS of the pressure vessel 10 has a temperature and a pressure that allow a composite material to be taken out, and brings the door of the pressure vessel 10 into an open state. After then, the operator of the composite material molding device 100 takes out the cured composite material from the internal space IS of the pressure vessel 10 to the outside. In addition, the operator of the composite material molding device 100 removes the second resin bag 50, the breather 40, and the first resin bag 30 in this order from the jig molding surface 21 of the molding jig 20, and exposes the composite material. In this manner, the composite material is molded.

Figure 5:
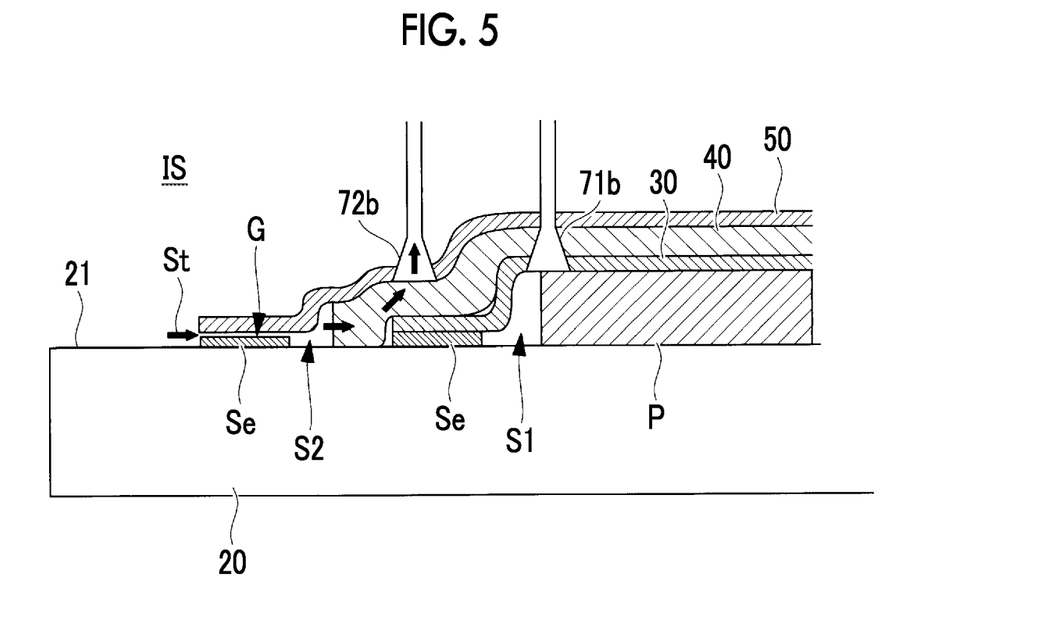
FIG. 5 is a partially enlarged view of the composite material molding device shown in FIG. 2, and shows a state where steam infiltrates from a gap between a second resin bag and a sealant.

Herein, a phenomenon that can occur when the composite material molding device 100 of the present embodiment performs Step S407 (heat-curing step) will be described. FIG. 5 is a partially enlarged view of the composite material molding device 100 shown in FIG. 2, and shows a state where steam infiltrates from a gap G between the second resin bag 50 and the sealant Se.

The second resin bag 50 of the present embodiment is formed of a resin film of which a main component is a fluororesin material. The resin film of which a main component is a fluororesin material is more advantageous in that this resin film has higher resistance to steam than a resin film of which a main component is nylon or polyurethane. On the other hand, the resin film of which a main component is a fluororesin material is more disadvantageous than the resin film of which a main component is nylon or polyurethane in that this film has lower adhering strength to the sealant Se.

FIG. 5 shows a state where the second resin bag 50 is peeled off from the sealant Se and the gap G is formed in a part of the second sealing region SA2 between the second resin bag 50 and the sealant Se. Arrows shown in FIG. 5 indicate steam St, and the steam St in the internal space IS infiltrates into the second space S2 via the gap G.

In this case, the steam St infiltrates into the second space S2, but the pressure of the second space S2 is sufficiently lower than the pressure of the internal space IS, so that the steam St diffuses in the second space S2 along the ventilation space formed by the breather 40. For this reason, the steam St infiltrated from the gap G is prevented from directly coming into contact with the first resin bag 30.

In addition, when Step S407 (heat-curing step) is being performed, a gas in the second space S2 is sucked out from the vacuum port 72b toward the vacuum pump 70 at all times. For this reason, the steam St infiltrated from the gap G into the second space S2 is introduced from the vacuum port 72b to the vacuum pump 70 by a suction force of the vacuum pump 70 in the end, and is discharged to the outside. The breather 40 serves a role of protecting the first resin bag 30 from the steam St infiltrated from the gap G into the second space S2 in this manner.

Figure 6:
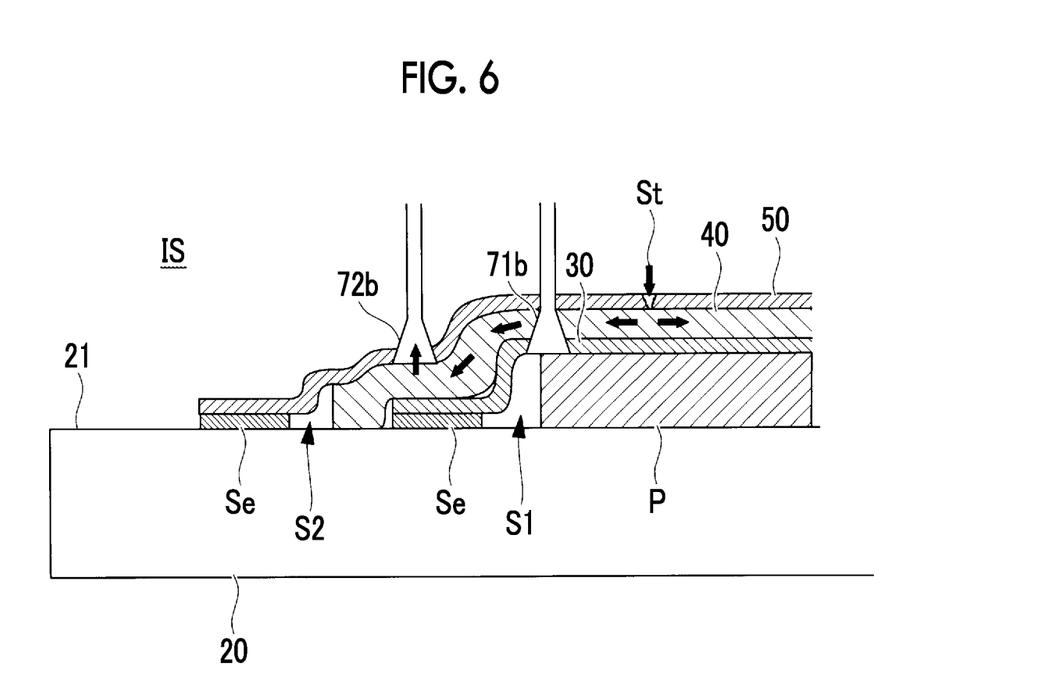
FIG. 6 is a partially enlarged view showing the composite material molding device shown in FIG. 2, and shows a state where a part of the second resin bag is broken and steam infiltrates.

Herein, another phenomenon that can occur when the composite material molding device 100 of the present embodiment performs Step S407 (heat-curing step) will be described. FIG. 6 is a partially enlarged view showing the composite material molding device 100, and shows a state where a part of the second resin bag 50 is broken and steam infiltrates.

FIG. 6 shows a state where a part of the second resin bag 50 is broken. Since the second resin bag 50 is formed of a resin film of which a main component is a fluororesin material, the second resin bag has high resistance to steam, but a part thereof can be broken due to some factors. Arrows shown in FIG. 6 indicate the steam St, and the steam St in the internal space IS infiltrates into the second space S2 via the broken part of the second resin bag 50.

In this case, the steam St infiltrates into the second space S2, but the pressure of the second space S2 is sufficiently lower than the pressure of the internal space IS, so that the steam St diffuses in the second space S2 along the ventilation space formed by the breather 40. For this reason, the steam St infiltrated into the second space S2 is prevented from directly coming into contact with the first resin bag 30.

In addition, when Step S407 (heat-curing step) is being performed, a gas in the second space S2 is sucked out from the vacuum port 72b toward the vacuum pump 70 at all times. For this reason, the steam St infiltrated from the internal space IS into the second space S2 is introduced from the vacuum port 72b to the vacuum pump 70 by a suction force of the vacuum pump 70 in the end, and is discharged to the outside. The breather 40 serves a role of protecting the first resin bag 30 from the steam St infiltrated from the internal space IS into the second space S2 in this manner.

The workings and effects achieved by the composite material molding method of the present embodiment described above will be described.

In order to heat-cure the prepreg P in the composite material molding method of the present embodiment, steam with a predetermined temperature and a predetermined pressure is supplied to the internal space IS of the pressure vessel 10 in the heat-curing step. For this reason, the prepreg P can be efficiently and quickly heated with steam having a larger heat capacity than the air compared to a case where air is used as a heating source.

In addition, the prepreg P is airtightly sealed by adhering the first resin bag 30 and the jig molding surface 21 to each other with the sealant Se, the breather 40 is airtightly sealed by further adhering the second resin bag 50 and the jig molding surface 21 to each other with the sealant Se, and the second space S2 sealed with the second resin bag 50 is depressurized in the second depressurizing step. For this reason, even when steam has infiltrated into the second space S2 where the breather 40 is disposed, the infiltrated steam is dispersed in the depressurized second space S2, and is discharged to the outside of the second space S2 in the end.

Since the prepreg P is airtightly sealed with the first resin bag 30, steam is prevented from reaching the prepreg P. Further, since the steam is discharged to the outside without reaching the first resin bag 30, it is prevented that the first resin bag 30 is damaged by hydrolysis with steam and the steam reaches the prepreg P.

In the composite material molding method of the present embodiment, the second resin bag 50 is a bag of which a main component is a fluororesin material. Since the resistance of the bag, of which a main component is a fluororesin material, to steam is sufficiently higher than a resin film of which a main component is nylon, the steam can be more reliably prevented from reaching the prepreg P. In addition, since the first resin bag 30 is a resin film of which a main component is a resin material having higher adhering strength to the sealant Se than the fluororesin material, the steam can be more reliably prevented from infiltrating from an adhering portion between the jig molding surface 21 and the resin film.

Second Embodiment

Hereinafter, a composite material molding device 100A and a composite material molding method using the composite material molding device according to a second embodiment of the present invention will be described with reference to the drawings. The present embodiment is a modification example of the first embodiment, is the same as the first embodiment except for cases particularly described below, and description thereof will be omitted below.

In the composite material molding device 100 of the first embodiment, the entire surface of the prepreg P is covered with the first resin bag 30 and the second resin bag 50, and the breather 40 is disposed therebetween. On the other hand, in the composite material molding device 100A of the present embodiment, the entire surface of the second resin bag 50 on the outer side is further covered with a third resin bag 60, and the breather 40 is disposed between the second resin bag 50 and the third resin bag 60.

Figure 7:
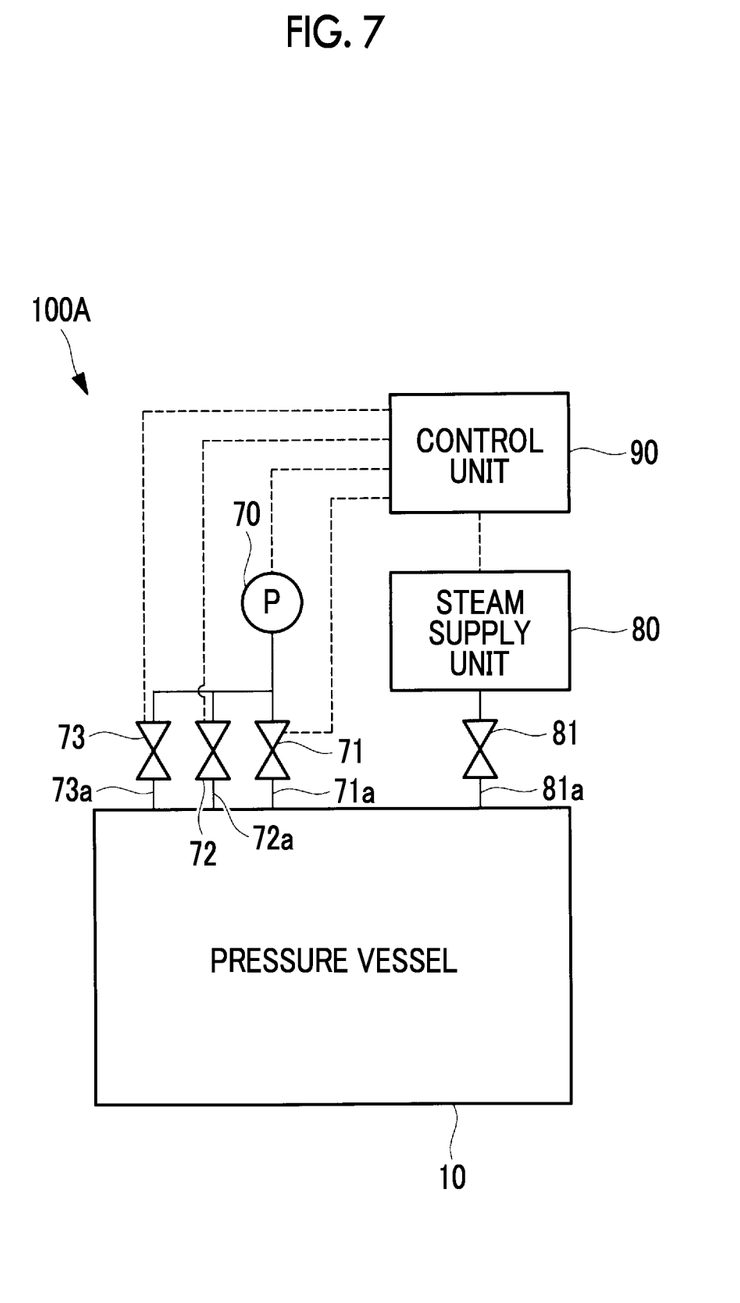
FIG. 7 is a schematic configuration diagram showing a composite material molding device according to a second embodiment of the present invention.
Figure 8:
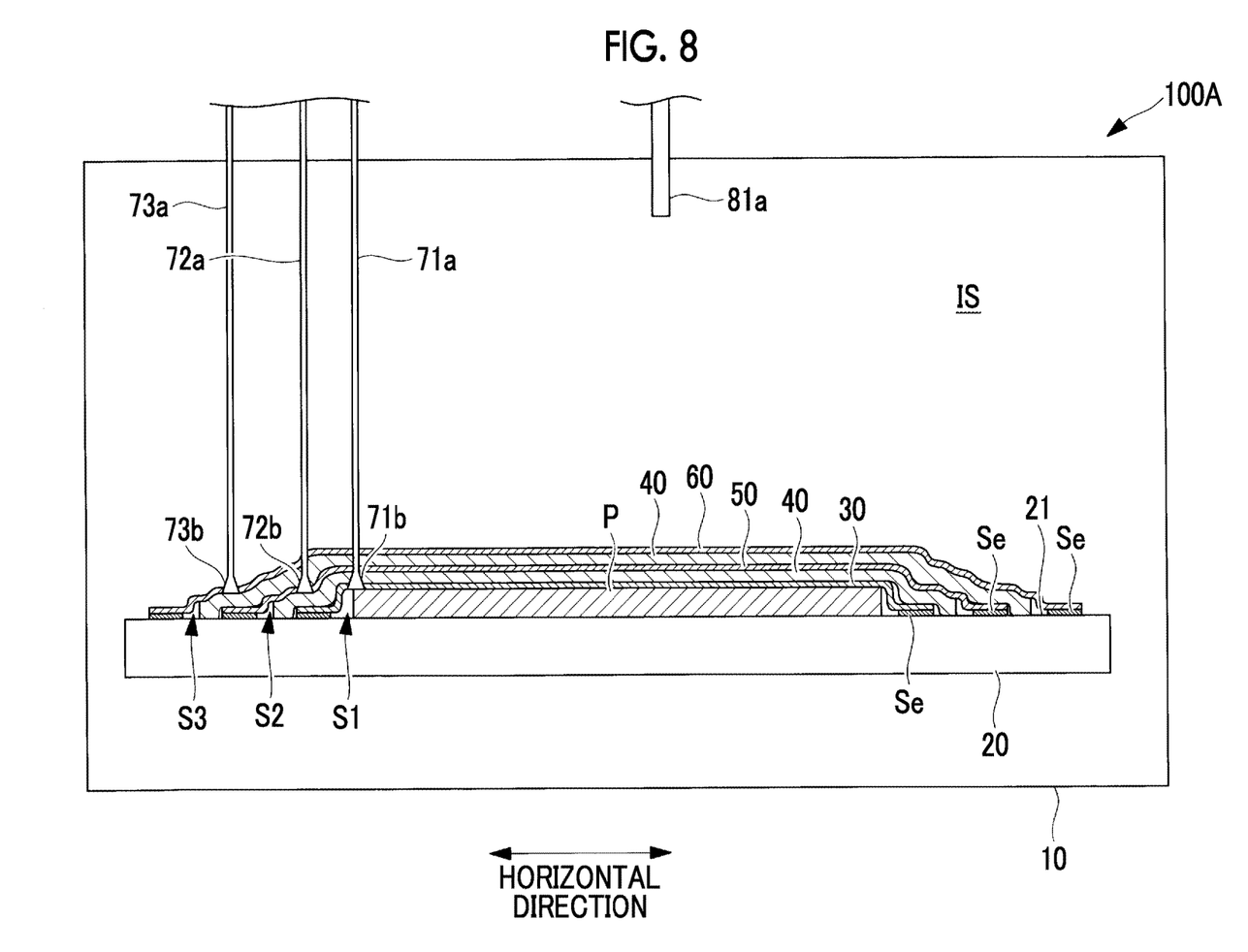
FIG. 8 is a vertical sectional view of the composite material molding device shown in FIG. 7.

FIG. 7 is a schematic configuration diagram showing the composite material molding device 100A according to the second embodiment of the present invention. The composite material molding device 100A shown in FIG. 7 is different from the composite material molding device 100 shown in FIG. 1 in terms of including an opening-closing valve 73 and a pipe 73a connected to the opening-closing valve 73. FIG. 8 is a vertical sectional view of the composite material molding device 100A shown in FIG. 7. The composite material molding device 100A shown in FIG. 8 is different from the composite material molding device 100 shown in FIG. 2 in terms of including the pipe 73a, a vacuum port 73b, the third resin bag 60, and the breather 40 disposed between the second resin bag 50 and the third resin bag 60.

As shown in FIG. 7, the vacuum pump 70 and the opening-closing valve 73 are controlled by control signals transmitted from the control unit 90 via control signal lines (broken lines in FIG. 7). As the control unit 90 brings the vacuum pump 70 into the operating state and brings the opening-closing valve 73 into an open state, air in a third space S3 shown in FIG. 8 is sucked via the vacuum port 73b and the third space S3 is depressurized to a vacuum state. The third space S3 is a space formed between the second resin bag 50 and the third resin bag 60.

As shown in FIG. 8, in the composite material molding device 100A of the present embodiment, the breather 40 is disposed on the second resin bag 50, and the third resin bag 60 is further disposed to cover the breather 40. The third resin bag 60 is a sheet-shaped member that covers the breather 40 and seals the breather 40 by being adhered to the jig molding surface 21 with the sealant Se. The third resin bag 60 is formed of a resin material of which a main component is silicone rubber or fluororubber.

Since the third resin bag 60 is formed of silicone rubber or fluororubber, the third resin bag has rubber elasticity and high resistance to steam. For this reason, the third resin bag 60 can be reused for molding a composite material a plurality of times.

Figure 9:
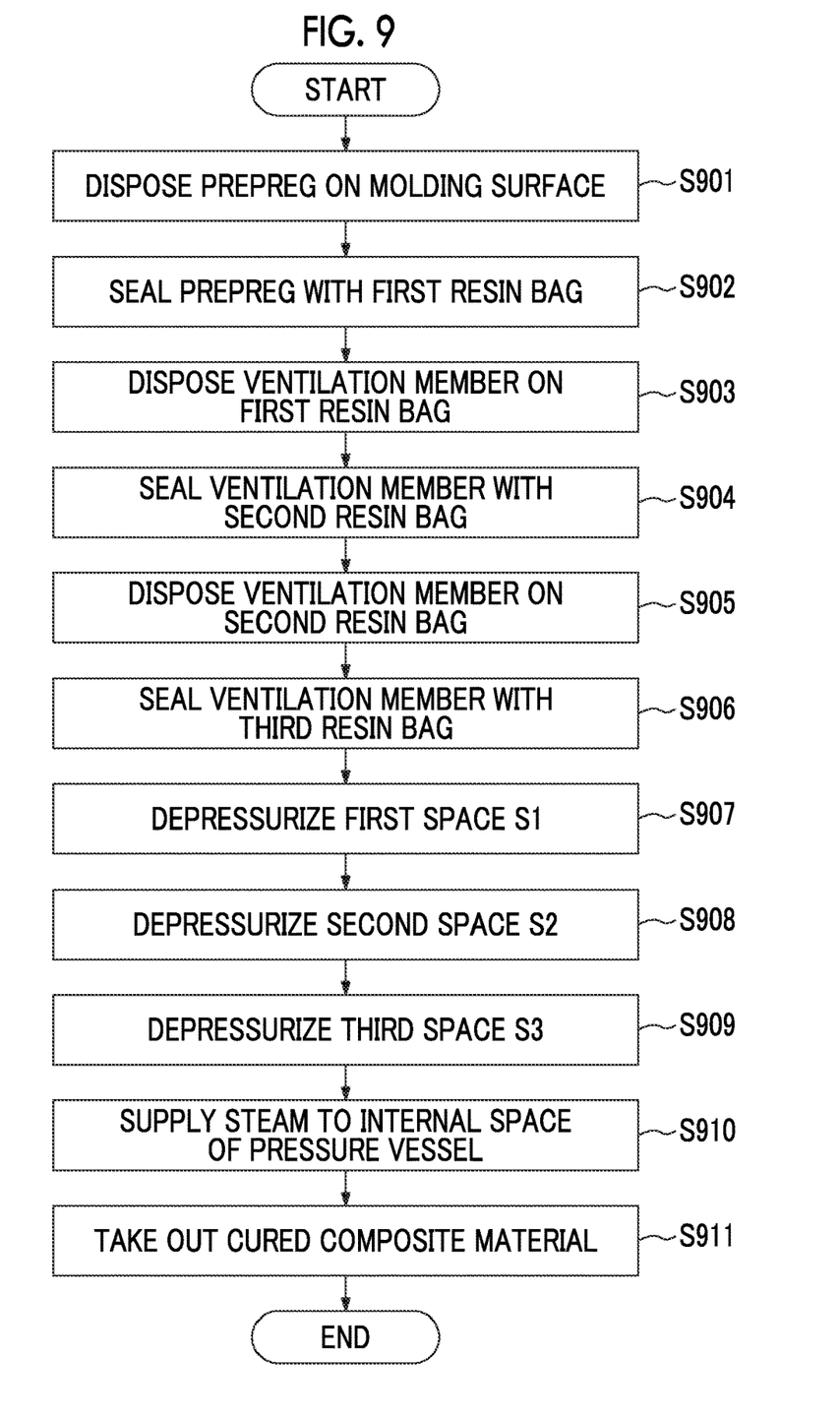
FIG. 9 is a flowchart showing a composite material molding method according to the second embodiment.

Next, the composite material molding method performed by the composite material molding device 100A of the present embodiment will be described with reference to FIG. 9. FIG. 9 is a flowchart showing the composite material molding method according to the present embodiment. Since Steps S901 to S904 shown in FIG. 9 are the same as Steps S401 to S404 shown in FIG. 4, description thereof will be omitted below.

In addition, since Steps S907 and S908 shown in FIG. 9 are the same as Steps S405 and S406 shown in FIG. 4, description thereof will be omitted below. In addition, since Steps S910 and S911 shown in FIG. 9 are the same as Steps S407 and S408 shown in FIG. 4, description thereof will be omitted below.

In Step S905 (third disposing step), the breather 40 is disposed on the second resin bag 50 such that the entire surface of the second resin bag 50 is covered.

In Step S906 (third sealing step), the breather 40 is airtightly sealed by covering the entire surface of the breather 40 with the third resin bag 60 and adhering the third resin bag 60 and the jig molding surface 21 to each other with the sealant Se. An operator of the composite material molding device 100A disposes the sealant Se on the jig molding surface 21 or an edge portion of the third resin bag 60, and bonds the third resin bag 60 to the jig molding surface 21 such that the entire surface of the breather 40 is covered with the third resin bag 60.

In Step S909 (third depressurizing step), the vacuum pump 70 is brought into an operating state, the opening-closing valve 73 is brought into an open state, and the third space S3 sealed with the third resin bag 60 is depressurized. The control unit 90 continues processing of depressurizing the third space S3 to maintain a vacuum state until the heat-curing step of Step S910 ends.

In the composite material molding method of the present embodiment, the breather 40 is airtightly sealed by adhering the third resin bag 60 and the jig molding surface 21 to each other with the sealant Se, and the space sealed with the third resin bag 60 is depressurized in the Step S909 (third depressurizing step). For this reason, even when steam has infiltrated into the third space S3 where the breather 40 is disposed, the infiltrated steam is dispersed in the depressurized third space S3, and is discharged to the outside of the third space S3 in the end.

Since the prepreg P is airtightly sealed with the first resin bag 30 and the second resin bag 50, steam is prevented from reaching the prepreg P. Further, since the steam is discharged to the outside without reaching the second resin bag 50, it is prevented that the second resin bag 50 is damaged by hydrolysis with steam and the steam reaches the prepreg P. In addition, since the third resin bag 60 is formed of a resin material of which a main component is fluororubber or silicone rubber with high resistance to steam, the third resin bag 60 can be reused for molding a composite material a plurality of times.

Although the breather 40 is disposed between the second resin bag 50 and the third resin bag 60 in the composite material molding method of the present embodiment, other aspects may be adopted. For example, instead of the breather 40, a modification example in which filling a space between the second resin bag and the third resin bag with a liquid, of which a main component is silicon based oil or water absorbent polymer and which protects from contact between the second resin bag 50 and steam, may be adopted.

In the composite material molding device of the modification example, the opening-closing valve 73 and the pipe 73a that are shown in FIG. 7 and the vacuum port 73b shown in FIG. 8 are not provided. In addition, in the flowchart shown in FIG. 9, Steps S905 and S909 are deleted.

In addition, Step S906 is a step of covering the second resin bag 50 with the third resin bag 60 and adhering the third resin bag 60 and the jig molding surface 21 to each other with the sealant Se to form an enclosed space. Further, after Step S906, a filling step of filling the enclosed space with a liquid for preventing steam from coming into contact with the second resin bag 50 is added.

In the modification example, the third resin bag 60 and the jig molding surface 21 are adhered to each other with the sealant Se to form an enclosed space with the second resin bag 50, and the enclosed space is filled with a liquid for preventing steam from coming into contact with the second resin bag 50. For this reason, even when the third resin bag 60 is hydrolyzed and damaged due to the steam, the steam infiltrated into the enclosed space can be prevented from reaching the second resin bag 50.

REFERENCE SIGNS LIST

10: pressure vessel
20: molding jig
21: jig molding surface
30: first resin bag
40: breather (ventilation member)
50: second resin bag
60: third resin bag
70: vacuum pump (depressurizing unit)
71, 72, 73, 81: opening-closing valve
71a, 72a, 73a, 81a: pipe
71b, 72b, 73b: vacuum port
80: steam supply unit
90: control unit 100, 100A: composite material molding device
G: gap
IS: internal space
P: prepreg (composite material)
S1: first space
S2: second space
S3: third space
SA1: first sealing region
SA2: second sealing region
Se: sealant
St: steam

The invention claimed is:

1. A composite material molding method of molding a composite material, the method comprising:
   a first disposing step of disposing the composite material on a jig molding surface of a molding jig provided in an internal space of an enclosable pressure vessel;
   a first sealing step of airtightly sealing the composite material by covering the composite material with a first resin bag and adhering the first resin bag and the jig molding surface to each other with a sealant;
   a second disposing step of disposing a ventilation member for securing a ventilation space such that the first resin bag is covered;
   a second sealing step of airtightly sealing the ventilation member by covering the ventilation member with a second resin bag and adhering the second resin bag and the jig molding surface to each other with the sealant;
   a first depressurizing step of depressurizing a first space sealed with the first resin bag;
   a second depressurizing step of depressurizing a second space sealed with the second resin bag; and
   a heat-curing step of heat-curing the composite material by supplying steam with a predetermined temperature and a predetermined pressure to the internal space of the pressure vessel in a state where the pressure vessel is enclosed,
   wherein the second resin bag is a bag of which a main component is a fluororesin material, and
   the first resin bag is a bag of which a main component is a resin material having higher adhering strength to the sealant than the fluororesin material.

2. The composite material molding method according to claim 1,
   wherein the first resin bag is formed of a resin film of which a main component is nylon or polyurethane.

3. The composite material molding method according to claim 1, further comprising:
   a third disposing step of disposing the ventilation member such that the second resin bag is covered;
   a third sealing step of airtightly sealing the ventilation member by covering the ventilation member, which covers the second resin bag, with a third resin bag and adhering the third resin bag and the jig molding surface to each other with the sealant; and
   a third depressurizing step of depressurizing a third space sealed with the third resin bag,
   wherein the third resin bag is formed of a material of which a main component is fluororubber or silicone rubber.

4. A composite material molding method of molding a composite material, the method comprising:
   a first disposing step of disposing the composite material on a jig molding surface of a molding jig provided in an internal space of an enclosable pressure vessel;
   a first sealing step of airtightly sealing the composite material by covering the composite material with a first resin bag and adhering the first resin bag and the jig molding surface to each other with a sealant;
   a second disposing step of disposing a ventilation member for securing a ventilation space such that the first resin bag is covered;
   a second sealing step of airtightly sealing the ventilation member by covering the ventilation member with a second resin bag and adhering the second resin bag and the jig molding surface to each other with the sealant;
   a first depressurizing step of depressurizing a first space sealed with the first resin bag;
   a second depressurizing step of depressurizing a second space sealed with the second resin bag;
   a heat-curing step of heat-curing the composite material by supplying steam with a predetermined temperature and a predetermined pressure to the internal space of the pressure vessel in a state where the pressure vessel is enclosed;
   an enclosing step of forming an enclosed space by covering the second resin bag with a third resin bag and adhering the third resin bag and the jig molding surface to each other with the sealant; and
   a filling step of filling the enclosed space with a liquid for preventing the steam from coming into contact with the second resin bag,
   wherein the third resin bag is formed of a material of which a main component is fluororubber or silicone rubber.

5. The composite material molding method according to claim 1,
   wherein the composite material is a laminate in which a fiber preform is laminated together with a resin material.

6. A composite material molding device that molds a composite material, the device comprising:
   an enclosable pressure vessel;
   a molding jig that is provided in an internal space of the pressure vessel and has a jig molding surface for disposing the composite material;
   a first resin bag that airtightly seals the composite material by covering the composite material and being adhered to the jig molding surface with a sealant;
   a ventilation member that is disposed to cover the first resin bag and is used for securing a ventilation space;
   a second resin bag that airtightly seals the ventilation member by covering the ventilation member and being adhered to the jig molding surface with the sealant;
   a depressurizing unit that depressurizes a first space sealed with the first resin bag and a second space sealed with the second resin bag; and
   a steam supply unit that supplies steam with a predetermined temperature and a predetermined pressure to the internal space of the pressure vessel in a state where the pressure vessel is enclosed and heat-cures the composite material,
   wherein the second resin bag is a bag of which a main component is a fluororesin material, and
   the first resin bag is a bag of which a main component is a resin material having higher adhering strength to the sealant than the fluororesin material.

* * * * *